United States Patent [19]
Contoyanis

[11] 4,134,175
[45] Jan. 16, 1979

[54] NON-ROTATING BUSHING

[75] Inventor: Peter J. Contoyanis, Libertyville, Ill.

[73] Assignee: Liquid Controls Corporation, North Chicago, Ill.

[21] Appl. No.: 829,599

[22] Filed: Sep. 1, 1977

[51] Int. Cl.² .............................................. F16C 32/00
[52] U.S. Cl. ..................................... 16/2; 308/237 R
[58] Field of Search ................ 16/2, 108; 308/237 R, 308/237 A, 238, 239; 174/152 R, 152 G, 153 R, 153 G; 217/113

[56] References Cited
U.S. PATENT DOCUMENTS

| | | | |
|---|---|---|---|
| 672,951 | 4/1901 | Merrick | 308/237 R X |
| 715,006 | 12/1902 | Bomgren | 308/237 R |
| 2,916,337 | 12/1959 | Fike | 308/237 R X |

FOREIGN PATENT DOCUMENTS

| | | | |
|---|---|---|---|
| 466001 | 10/1951 | Italy | 308/237 R |
| 478918 | 1/1938 | United Kingdom | 308/237 R |

*Primary Examiner*—Dorsey Newton

[57] ABSTRACT

A non-rotating sleeve type bushing in which an eccentric flange integral with the bushing and projecting radially outwardly therefrom is so formed as to be received in a complementarily contoured flange recess in a bearing housing whereby rotation of the bushing with respect to the bearing housing is precluded by a positive mechanical locking action provided by the shear resistance of the flange member.

11 Claims, 6 Drawing Figures

NON-ROTATING BUSHING

This invention relates generally to sleeve-type bushings, and specifically to a non-rotating cylindrical type bushing in which a positive mechanical locking force prevents rotation of the bushing in addition to any other rotation restricting force - such as the friction force resulting from the press fit of the bushing - that may be present.

BACKGROUND OF THE INVENTION

Bronze and steel bushings as well as those made of other materials having a total wall thickness varying from very thin to heavy are widely used in a variety of specialized journal bearing applications. Bushings of this type are usually pressed into place, and thereafter the bearing surface may be finished by burnishing with a slightly tapered bar to a mirror finish if the application so requires. Light press fits, together with securement by set screws or keys, are considered preferable to heavy press fits and no keying, since heavy press fits, especially in thin walled bushings, will set up stresses which will release themselves if the bearing should run hot in service, and will result in closing in on the journal and scoring upon cooling.

However, the provision of a set screw, or a key way and key, substantially increases the total cost of the bushing when the total installed bushing cost is considered, and, since at least some labor is involved in adjusting the set screw or assembling the key and key way prior to press fitting, there is always a possibility of mis-alignment, in the former situation, or, mis-adjustment and mis-alignment in the latter situation. Further, assembly of such conventional bushings is often restricted in that assembly operations must take place in only rather specific orientations. For example, keys must usually be installed from a top position.

SCOPE OF THE INVENTION

Accordingly a primary object of this invention is to provide a bushing which can be assemblied to a bearing housing with only a light press fit, and, after press fitting, will be additionally restrained from undesired rotation in the journal or bearing housing by a positive mechanical locking force.

Another object is to provide a bushing as above described in which the additional positive mechanical locking force is as equally applicable to thick walled as to thin walled bushings whereby the generally less expensive thin walled bushings may be used in a greater number of applications.

Yet another object is to provide a non-rotating sleeve type bushing in which shearing resistance is effective to preclude rotation of the bushing when in use without affecting the bushing bore.

A further object is to provide a bushing which is no more expensive to fabricate and install then conventional set screw and key way bushings, yet which is not subject to the possible sources of failure of such conventional bushings, including scoring, mis-alignment, stripped threads, mis-assembly and position orientation assembly restrictions.

Other objects and advantages of the invention will become apparent from a reading of the following exemplary description thereof.

DESCRIPTION OF SPECIFIC EMBODIMENT

The invention is illustrated more or less diagrammatically in the accompanying drawing wherein FIG. 1 is a top plan view of one embodiment of the bushing of this invention shown in an assembled condition;

Like reference numerals will be used to refer to like parts from Figure to Figure in the drawing.

Figure 1:
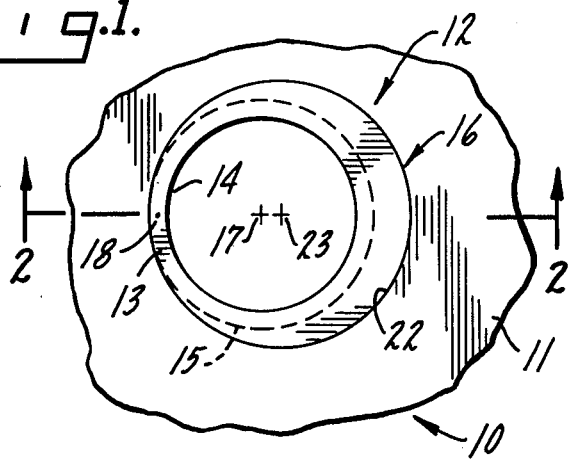

The new and improved non-rotating sleeve type bushing assembly of this invention is illustrated generally at 10 in FIG. 1.

The bushing assembly includes a bearing housing 11 and a non-rotating sleeve type bushing indicated generally at 12. The bushing 12 includes a sleeve 13 which has an interior surface 14 and an exterior surface 15. Sleeve 13 is assembled to bearing housing 11 with a light press fit, although, if desired, a heavy press fit, or even a slip fit, may be employed. It will be understood that the inventive concept is substantially independent of the degree of the press fit employed, so that, if desired a light, or at least a lighter, press fit may be employed in many environments as contrasted to the degree of press fit which is currently required. Interior surface 14 can, if required, be burnished to a mirror like surface finish for close precision work. However there are some applications where load and speed of the journal do not require this fine finish.

A flange member is indicated generally at 16. The flange member, in this instance, is circular in external configuration and projects radially outwardly from the central axis 17 of the sleeve a substantial distance beyond the periphery of exterior surface 15 of sleeve 13, all as best illustrated in the section view of FIG. 2.

In this instance, the periphery of the flange member is coincident at a point 18 on the periphery of the exterior surface 15 of the sleeve.

Figure 2:
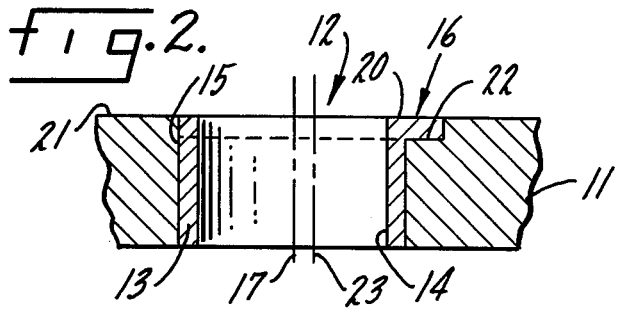
FIG. 2 is a section taken substantially along line 2—2 of FIG. 1.

As best seen in FIG. 2, the upper surface 20 of flange member 16 is flush with the upper surface 21 of the bearing housing 11 but does not necessarily have to be, as explained hereinafter. The bearing housing is recessed, as at 22, to receive flange member 16, the recess 22 being configured to have substantially the same nominal dimensions as the periphery of flange member 16. As will be noted in FIG. 1, the radial center of both flange member 16 and recess 22 coincide at point 23.

Figure 3:
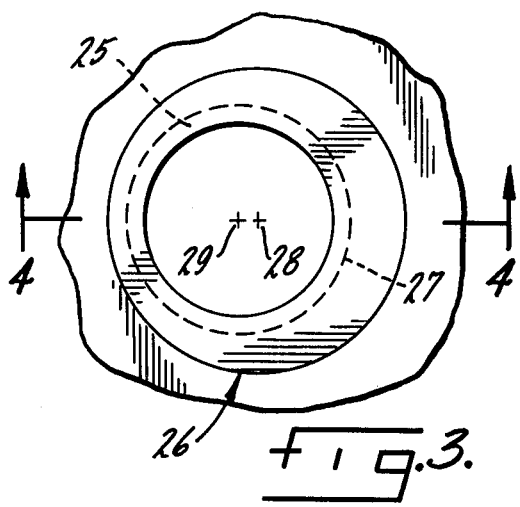
FIG. 3 is a top plan view of another embodiment of the invention.
Figure 4:
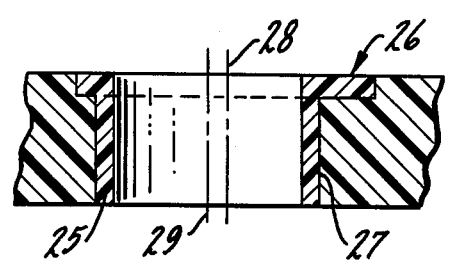
FIG. 4 is a section taken substantially along the line 4—4 of FIG. 3.

In the embodiment illustrated in FIGS. 3 and 4, a bearing sleeve is indicated at 25. A flange member is indicated generally at 26, the flange member 26 being formed integrally with sleeve 25. In this instance the flange member 26 projects radially outwardly beyond the exterior surface 27 of sleeve 25 at all locations along the periphery of surface 27.

It will be understood that, when assembled with a bearing housing, the flange member 26 will be received in a complementarily recess in the bearing housing which receives the bushing. The center of both flange member 26 and the recess in the bearing housing which receives the flange member is indicated at 28, said center being located a short distance from axis 29 of sleeve 25.

Figure 5:
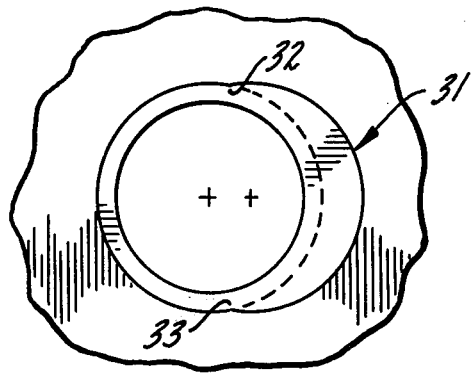
FIG. 5 is a top plan view of another embodiment of the invention.

In the embodiments of FIGS. 1 and 3 it will be noted that the periphery of the flange member 16 and 26, respectively, is defined by a smooth, continous, curved line. In the embodiment of FIG. 5 a slightly different construction is employed in that the flange member, indicated generally at 31, in this embodiment takes the shape of, in effect, two offset, but overlapping, circles, with the result that the periphery of the flange line takes the shape of a curved line which is irregular in the sense that two distinct points, indicated at 32 and 33, are formed in the periphery. It will be understood that the bushing — including the sleeve portion and the flange portion — may be molded or formed to fit the recess, especially when the bushing is formed from non-metallic materials. One advantage of the type of configuration of the flange member illustrated in the embodiment of FIG. 5 which is present irrespective of the type of material used is that the bearing housing recess can be formed from the same tool as is used to form the hole in the bearing housing which receives the sleeve.

Figure 6:
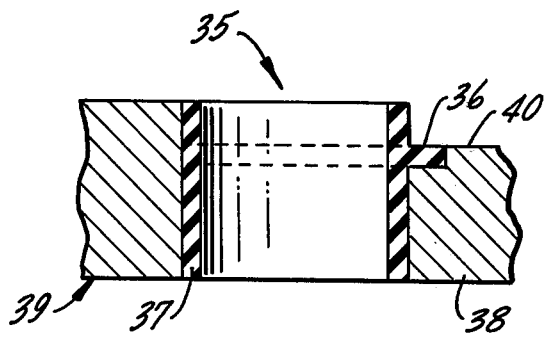
FIG. 6 is a section through another embodiment of the invention.

In the embodiment of FIG. 6, bushing 35 includes a flange 36 which projects radially outwardly from the sleeve portion 37 of the bushing at a location between the ends thereof, Such a construction may be preferred in instances when design considerations require that one portion 38 of the bearing housing 39 be recessed, as illustrated for example at 40.

It will be noted that in each illustrated embodiment the provision of, in effect, an eccentric flange projecting outwardly from the bushing prevents rotation of the bushing after installation. More particularly, it may be said, in geometrical terms, that the radial distance between the exterior surface of the sleeve and the perimeter of the flange continuously increases from each point of least radial distance between the exterior surface of the sleeve and the perimeter of the flange member (i.e.: point 18 in FIG. 1, the left most edge point of flange 26 in FIG. 3, and points 32 and 33 of FIG. 5) to the point of maximum radial distance between the exterior surface of the sleeve and the perimeter of the flange (i.e.: the right most edge point of flange 16 in FIG. 1, flange 26 in FIG. 3, and flange 31 in FIG. 5). It will further be noted that the distances defined between the point, or points, of least radial distance and maximum radial distance define arcs, each of which is of 180° in FIG. 1, for example. In effect, the eccentric flange locks the bushing into place with respect to the bearing housing or other bushing receiving member by exertion of a positive mechanical locking force.

Specifically, movement of the sleeve 13, 25 or 37 is only possible if the material forming the eccentric flange fails in shear.

Thus, it is usually possible to utilize a light press fit, and, in some environments, even a simple snug fit, or even a slip flit, since the reception of the eccentric flange member in its complementarily contoured recess positively precludes rotation of the sleeve with respect to the bearing housing.

It should be noted that the invention is independent of the type of material used in the construction of the bushing and the bearing housing. Thus metal-to-metal is illustrated in the embodiment of FIGS. 1 and 2, plastic-to-plastic in the embodiment of FIGS. 3 and 4, and rubber-to-metal in the embodiment of FIG. 6.

It should also be understood that the eccentric flange may be of virtually any desired thickness, and, further, that the provision of tolerances between the flange and its receiving recess in the bearing housing, and between the exterior surface of the sleeve and the sleeve hole are substantially less critical then in conventional constructions.

And finally, it should be understood that the contour of the recess in the bearing housing need not conform at every point to the contour of the flange member which is received in it. For many, if not all, applications, it is only necessary that the flange member be in contact with the bearing housing at at least two spaced locations. However, it will usually be just as convenient to provide a recess which is totally complementarily to the flange member at all points along the periphery of each, rather than at only two, or a few selected, points.

Although specific and preferred embodiments of the invention have been illustrated and described, it will be understood that the foregoing description is exemplary only. Accordingly, it is intended that the scope of the invention not be limited by the foregoing exemplary description, but rather only by the scope of the hereafter appended claims when interpreted in light of the pertinent prior art.

I claim:

1. A non-rotating sleeve type bushing, said bushing including, in combination, a sleeve, said sleeve having an exterior surface formed and adapted to be received in a suitable receptacle, such as a bearing housing, and an interior surface formed and adapted to receive a rotating member, and a flange member, said flange member being integral with the sleeve, at least one protion of said flange member extending outwardly from the central axis of the sleeve to a point located radially outwardly beyond the exterior surface of the radially adjacent portion of said sleeve, said flange member having a continuous, smooth curve perimeter, and being characterized in that, with respect to the axis of the sleeve, the radial distance between the exterior surface of the sleeve and the perimeter of the flange continuously increases from each point of least radial distance between the exterior surface of the sleeve and the perimeter of the flange member to the point of maximum radial distance between the exterior surface of the sleeve and the perimeter of the flange along at least a substantial portion of the two arcs defined between the aforesaid points of least radial distance to the maximum radial distance whereby a shearing resistance will be induced in those portions of the flange member corresponding to the aforesaid arcs in response to forces applied to said bushing in a direction tending to cause the bushing to rotate with respect to a receptacle within which it is received.

2. The non-rotating sleeve type bushing of claim 1 further characterized in that said flange member is located at one end of the sleeve.

3. The non-rotating sleeve type bushing of claim 1 further characterized in that said flange member is located intermediate the ends of the sleeve.

4. The non-rotating sleeve type bushing of claim 1 further characterized in that
   the flange member includes
   a portion thereof, at least, having a circular configuration,
   one point on said circular configuration protion of said flange member being co-extensive with a point lying on the outline of the periphery of the exterior surface of said sleeve.

5. The non-rotating sleeve type bushing of claim 1 further characterized in that
   all portions of the periphery of said flange member are disposed radially outwardly from the central axis of the sleeve a distance greater than any point lying on the outline of the periphery of the exterior surface of the sleeve.

6. The non-rotating sleeve type bushing of claim 1 further characterized in that
   the periphery of said flange member is formed from a smooth, continuous line.

7. The non-rotating sleeve type bushing of claim 6 further characterized in that
   the periphery of said flange member is circular in configuration.

8. The non-rotating sleeve type bushing of claim 7 further characterized in that
   at least one point on said circular configuration portion of said flange member is co-extensive with a point lying on the outline of the periphyer of the exterior surface of said sleeve.

9. The non-rotating sleeve type bushing of claim 1 further characterized in that
   the periphery of said flange member is formed from an irregular, continuous line.

10. The non-rotating sleeve type bushing of claim 9 further characterized in that
    the periphery of said flange member is formed from a pair of overlapping circles which are struck about centers offset from one another, at least one of said centers being offset from the central axis of the sleeve.

11. In a non-rotating sleeve type bushing assembly, the combination of
    a sleeve, said sleeve having
    an exterior surface formed and adapted to be received in a suitable receptacle, such as a bearing housing, and
    an interior surface formed and adapted to receive a rotating member, and
    a flange member,
    said flange member being integral with the sleeve,
    at least one portion of said flange member extending outwardly from the central axis of the sleeve to a point located radially outwardly beyond the exterior surface of the radially adjacent portion of said sleeve,
    said flange member having a continuous, smooth curve perimeter, and being characterized in that, with respect to the axis of the sleeve,
    the radial distance between the exterior surface of the sleeve and the perimeter of the flange continuously increases from each point of least radial distance between the exterior surface of the sleeve and the perimeter of the flange member
    to the point of maximum radial distance between the exterior surface of the sleeve and the perimeter of the flange
    along at least a substantial portion of the two arcs defined between the aforesaid points of least radial distance to the maximum radial distance
    whereby a shearing resistance will be induced in those portions of the flange member corresponding to the aforesaid arcs in response to forces applied to said bushing in a dirction tending to cause the bushing to rotate with respect to a receptacle within which it is received, and
    a bearing housing,
    said bearing housing having a first portion formed and adapted to receive said sleeve portion, and
    a second portion,
    said second portion being contoured substantially complementarily to said flange member,
    the complementarily contour of said second, sleeve receiving portion being so disposed as to snuggly receive and hold said flange member, and thereby said sleeve, in non-rotatable relationship with respect to said bearing housing at at least a plurality of points about the periphery of the flange member.

* * * * *